United States Patent
Ohkawa (10) Patent No.: US 8,019,070 B2
(45) Date of Patent: Sep. 13, 2011

(54) TELECONFERENCING DEVICE, AND TELECONFERENCE INITIATING METHOD AND PROGRAM THEREOF

(75) Inventor: Tomoki Ohkawa, Tokyo (JP)

(73) Assignees: Pioneer Corporation, Tokyo (JP); Pioneer Solutions Corporation, Tokyo (JP)

( * ) Notice: Subject to any disclaimer, the term of this patent is extended or adjusted under 35 U.S.C. 154(b) by 1220 days.

(21) Appl. No.: 11/714,783

(22) Filed: Mar. 7, 2007

(65) Prior Publication Data

US 2007/0211140 A1 Sep. 13, 2007

(30) Foreign Application Priority Data

Mar. 7, 2006 (JP) ................ P2006-061223

(51) Int. Cl.
*H04M 3/42* (2006.01)
(52) U.S. Cl. ............... 379/202.01; 379/202.03
(58) Field of Classification Search ............. 348/14.01; 379/202.01, 202.03
See application file for complete search history.

(56) References Cited

U.S. PATENT DOCUMENTS

2002/0060697 A1* 5/2002 Sasazaki et al. .......... 345/753
2005/0141508 A1* 6/2005 Ogawa .................. 370/394

FOREIGN PATENT DOCUMENTS

JP  2004-173180 A  6/2004

* cited by examiner

*Primary Examiner* — Curtis Kuntz
*Assistant Examiner* — Amal Zenati
(74) *Attorney, Agent, or Firm* — Sughrue Mion, PLLC (57) ABSTRACT

A teleconferencing device includes: a connecting unit fitted into an information processing device; and a storage unit storing: a teleconference application program which is automatically started by fitting the connecting unit into the information processing device; self-location information which is location information of the teleconferencing device; and destination location information which is location information of a connection destination holding a teleconference, wherein the teleconference application program reads the self-location information and the destination location information and connects the information processing device to an information processing device of the connection destination via a network.

11 Claims, 6 Drawing Sheets

```
[SELF-LOCATION INFORMATION]
NAME OF LOCATION = TOKYO HEAD OFFICE
IP ADDRESS = XXX.XXX.0.5
WAITING PORT NO. = 50000
NUMBER OF CONFERENCE LOCATIONS = 2
[CONNECTING LOCATION]
NAME OF LOCATION = OSAKA OFFICE
IP ADDRESS = XXX.XXX.0.7
CODING DATA = 15 kd[478
```

FIG. 2B

```
[SELF-LOCATION INFORMATION]
NAME OF LOCATION = TOKYO HEAD OFFICE
IP ADDRESS = XXX.XXX.0.5
WAITING PORT NO. = 50000
NUMBER OF CONFERENCE LOCATIONS = 3
[CONNECTING LOCATION 1]
NAME OF LOCATION = OSAKA OFFICE
IP ADDRESS - XXX.XXX.0.7
CODING DATA = 15 kd[478
[CONNECTING LOCATION 2]
NAME OF LOCATION = HIROSHIMA OFFICE
IP ADDRESS = XXX.XXX.0.10
CODING DATA = 5 jk-^s
```

TELECONFERENCING DEVICE, AND TELECONFERENCE INITIATING METHOD AND PROGRAM THEREOF

CROSS-REFERENCE TO RELATED APPLICATIONS

This application is based on and claims the benefit of priority from the prior Japanese Patent Application No. 2006-061223, filed on Mar. 7, 2006; the entire contents of which are incorporated herein by reference.

BACKGROUND

1. Technical Field

The present invention relates to a teleconferencing device, and a teleconference initiating method and a program of the teleconferencing device which allow exchanges of images, voices, and electric data between remote information processing terminals.

2. Related Art

There has been provided a teleconferencing device representative of a TV conference system. Recently, a system which can readily distribute materials (electric data) used for a conference by using a portable storage device (for example, see JP-A-2004-173180), and a software storing USB memory for TV conference in which the software is automatically started by fitting the memory into a terminal have been proposed in order to improve convenience in the teleconference.

Particularly, in the software storing USB memory for TV conference, since the software for TV conference is started only by fitting the USB memory, a user can easily participate in the TV conference regardless of locations without selecting the terminal.

SUMMARY

However, the most troublesome work in the teleconference such as the TV conference is rather the setting of a connection with an opposite location terminal than the starting of the application software. For example, there is no problem when the conference is always held with the same opponent (location terminal), but the opponent generally changes depending on the conference. Particularly, the user not familiar with using PC may need times to set or change the connection destination or may improperly perform the connection.

An object of the invention is to provide a teleconferencing device which can automatically start an application program for teleconference by fitting the teleconferencing device into an information processing device such as PC and automatically connect the information processing device to a location terminal of a connection destination registered in advance, and a teleconference initiating method and a program of the teleconferencing device.

According to an aspect of the invention, there is provided a teleconferencing device including: a connecting unit fitted into an information processing device; and a storage unit storing: a teleconference application program which is automatically started by fitting the connecting unit into the information processing device; self-location information which is location information of the teleconferencing device; and destination location information which is location information of a connection destination holding a teleconference, wherein the teleconference application program reads the self-location information and the destination location information and connects the information processing device to an information processing device of the connection destination via a network.

According to another aspect of the invention, there is provided a teleconference initiating method of a teleconferencing device including a teleconference application program which is automatically started by fitting the teleconferencing device into an information processing device, self-location information which is location information of the teleconferencing device, and destination location information which is location information of a connection destination holding a teleconference, the method including: starting the teleconference application program; acquiring device information required for the teleconference; reading the self-location information and the destination location information; connecting the information processing device to an information processing device of the connection destination via a network, on the basis of the self-location information and the destination location information; and initiating a communication between the locations after the connection is completed.

According to another aspect of the invention, there is provided a teleconference initiating program product for enabling a computer to initiating a teleconference using a teleconferencing device including a teleconference application program which is automatically started by fitting the teleconferencing device into the information processing device, self-location information which is location information of the teleconferencing device, and destination location information which is location information of a connection destination holding a teleconference, the program product including: software instructions for enabling the computer to perform predetermined operations; and a computer readable medium bearing the software instructions, wherein: the predetermined operations including: starting the teleconference application program; acquiring device information required for the teleconference; reading the self-location information and the destination location information; connecting the information processing device to an information processing device of the connection destination via a network, on the basis of the self-location information and the destination location information; and initiating a communication between the locations after the connection is completed.

DESCRIPTION OF THE EMBODIMENTS

Hereinafter, embodiments according to the invention will be described.

A teleconferencing device according to the present embodiment includes the following (1) to (3):

(1) a teleconference application program which is automatically started by fitting the teleconferencing device into the information processing device;

(2) self-location information which is location information of the teleconferencing device; and (3) destination location information which is location information of the connection destination holding a conference.

In addition, it is preferable that the teleconference application program (1) reads the self-location information (2) and the destination location information (3) and connects the information processing device to an information processing device of the connection destination via a network.

It is preferable that the teleconferencing device according to an embodiment of the invention further includes a starting module which starts the teleconference application program.

Further, it is preferable that the self-location information and the destination location information are included in the teleconference application program and have at least one of an IP address, a name of a location, and conference environment information, and the destination location information is the destination location information of a plurality of locations and has a code key which codes communication signals with the connection destination location.

The IP address may be acquired by a DNS server or the like from the domain name which is the name of the location included in the information processing terminal of the connection destination (such as PC). In addition, the self-location information and the destination location information may include, for example, phone numbers of the self-location and the connection destination, other than the IP address.

It is preferable that the teleconferencing device is a portable storage device and the portable storage device is a USB memory.

In the teleconferencing device according to an embodiment of the invention, only by selecting a corresponding teleconferencing device every connection destination and fitting the selected teleconferencing device into the information processing terminal, it becomes possible to start the application program for the conference and automatically connect the device with the objective location terminal of the connection destination. Therefore, even a user not familiar with using PC can easily hold the teleconference.

Particularly, when the teleconferencing device includes the portable storage device such as a USB memory, the teleconference can be easily held regardless of places and terminals.

Since it is not necessary to store specific information relating to the self-location or the location of the connection destination in the information processing terminal (such as PC), the specific information does not remain in the terminal after the conference is finished. Thus, the teleconference having high security can be achieved.

According to an embodiment of the invention, a teleconference initiating method of a teleconferencing device including the teleconference application program which is automatically started by fitting the teleconferencing device into the information processing device, the self-location information which is the location information of the teleconferencing device, and the destination location information which is location information of a connection destination holding a teleconference includes: starting the teleconference application program; acquiring device information required for the teleconference; reading the self-location information and the destination location information; connecting the information processing device to an information processing device of the connection destination via the network, on the basis of the self-location information and the destination location information; and initiating a communication between locations after the connection is completed.

In the teleconference initiating method according to the embodiment of the invention, when the device is fitted into the information processing terminal such as PC, it is possible to automatically start the stored application program for the teleconference and automatically connect the device with the location terminal of the connection destination which is set in advance.

According to an embodiment of the invention, a program of the teleconference initiating method of the teleconferencing device including the teleconference application program which is automatically started by fitting the teleconferencing device into the information processing device, the self-location information which is location information of the teleconferencing device, and the destination location information which is location information of a connection destination holding a teleconference, allows a computer to execute steps of the teleconference initiating method of the teleconferencing device: starting the teleconference application program; acquiring the device information required for the teleconference; reading the self-location information and the destination location information; connecting the information processing device to the information processing device of the connection destination via the network, on the basis of the self-location information and the destination location information; and initiating the communication between locations after the connection is completed.

According to the teleconference initiating program of the teleconference initiating method of the teleconferencing device of the invention, when the device is fitted into the information processing terminal such as PC, it is possible to automatically start the stored application program for the teleconference and automatically connect the device with the location terminal of the connection destination which is set in advance.

Hereinafter, a specific example of the embodiments of the teleconferencing device, and the teleconference initiating method and the program of the teleconferencing device will be described in detail with reference to drawings.

Figure 1:
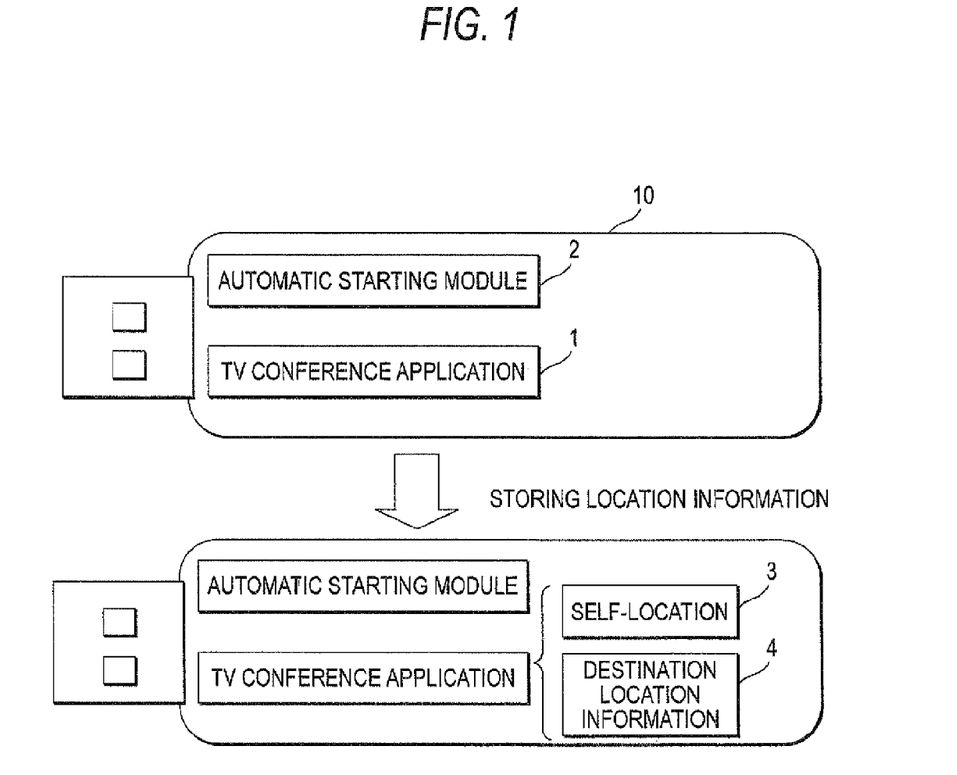
FIG. 1 shows a configuration of a teleconferencing device according to an embodiment of the present invention.

FIG. 1 shows a configuration of the teleconferencing device according to an embodiment of the invention. In the present embodiment, the teleconferencing device includes an USB memory 10, and a TV conference application 1 and an automatic starting module 2 are stored in advance in the USB memory 10. In the USB memory 10, self-location information 3 and destination location information 4 which are required for the connection between locations when the TV conference is held are stored. The stored data is written in a format which can be read by the TV conference application 1.

The self-location information 3 and the destination location information 4 may be written at the time of manufacturing by a manufacturer of the teleconference device or may be appropriately written or rewritten by a user of the teleconferencing device. In addition, the TV conference application 1 and the location information (the self-location information 3 and the destination location information 4) may not necessarily have different modules and the location information may be stored at the time of compiling the TV conference application.

Figure 2A:
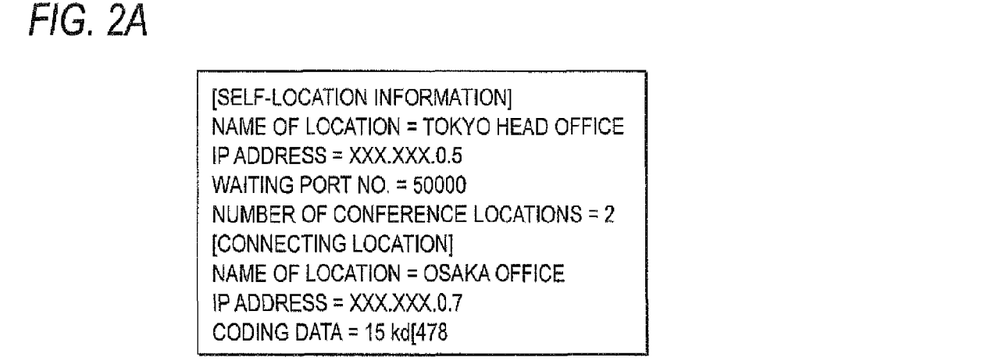
FIGS. 2A and 2B show configuration examples of data of location information stored in the teleconference device according to an embodiment of the invention.
Figure 2B:
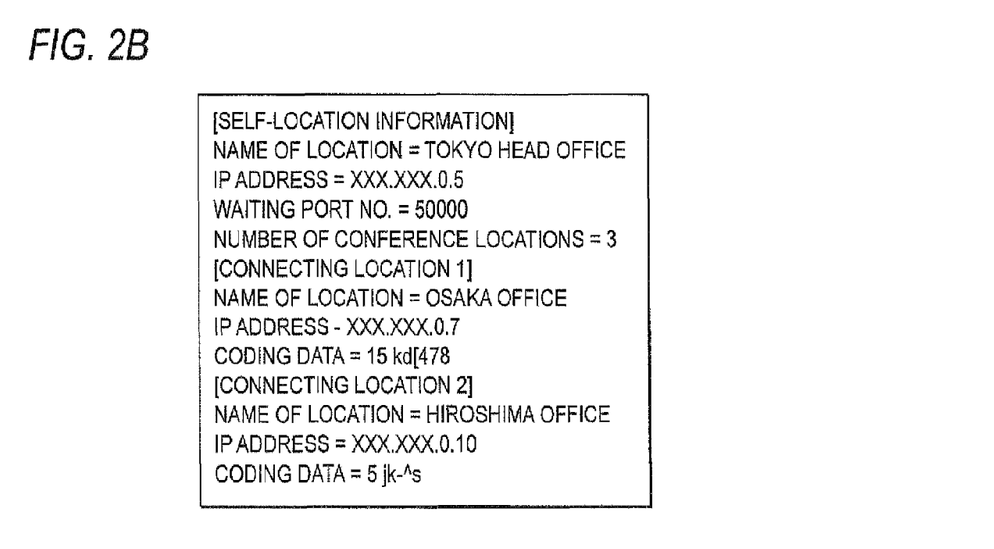

FIGS. 2A and 2B show configuration examples of data of location information stored in the teleconference device (USB memory) according to an embodiment of the invention. The location information includes the self-location information 3, the destination location information 4, and the information such as the IP address for specifying location terminal. The TV conference application 1 establishes the connection between locations on the basis of the location information.

When the USB memory storing the information is fitted into a personal computer (hereinafter, referred to as PC) which is the information processing terminal, the conference connection with the connection destination will be carried out in the following procedures. In the example shown in FIG. 2A, the conference connection with "Osaka Office" recorded in 'connecting location' as the connection destination is carried out.

In addition, one of the self-location information 3 may have a plurality of destination location information 4. For example, in the example shown in FIG. 2B, the conference connection may be carried out with the plurality of connection destinations which are "Osaka Office" recorded in 'connecting location 1' and "Hiroshima Office" recorded in 'connecting location 2'.

Figure 3:
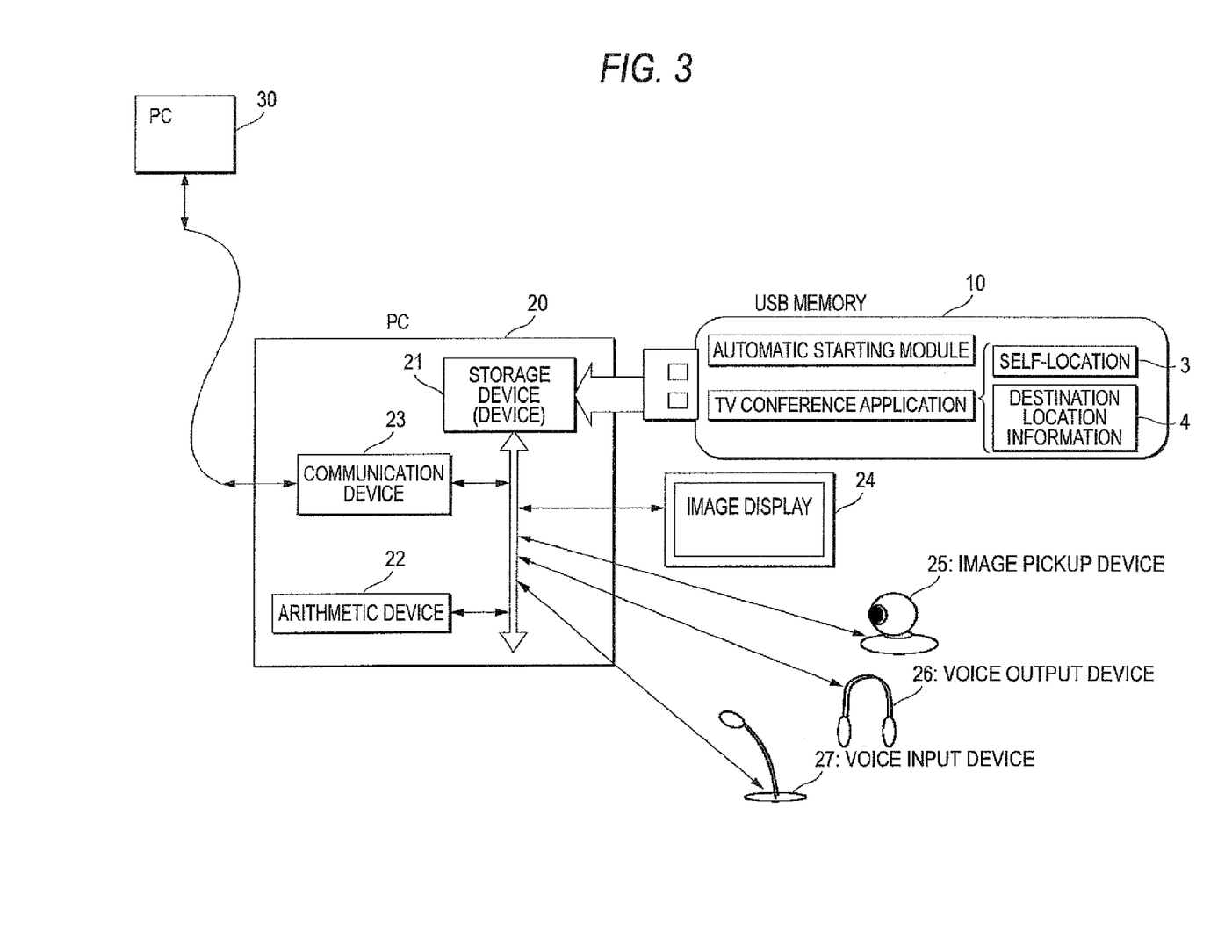
FIG. 3 shows an outline of a teleconferencing system which includes a teleconferencing device, a PC into which the teleconferencing device is fitted, and its peripheral device according to an embodiment of the invention.

Next, FIG. 3 shows an outline of a teleconferencing system which includes the teleconferencing device, a PC into which the teleconferencing device is fitted, and its peripheral device according to an embodiment of the invention. The PC 20 into which the teleconferencing device (USB memory 10) is fitted is the information processing terminal functioning as a self-location terminal and is equipped with a storage device 21, an arithmetic device 22, and a communication device 23. The PC 20 can communicate with the other information processing terminal such as a PC 30 via the communication device 23. In this case, the PC 30 serves as the location terminal of the connection destination. The PC 30 is connected to an image display device 24, an image pickup device 25, a voice output device 26, and a voice input device 27 as the peripheral devices required for the conference.

When the USB memory 10 is fitted into the PC 20, the automatic starting module 2 of the contents read by the storage device 21 is first executed by the arithmetic device 22. Then, the TV conference application 1. registered in the automatic starting module 2 is also executed by the arithmetic device 22, thereby starting the TV conference application.

Next, an operation of the teleconference system having the aforementioned configuration will be described.

Figure 4:
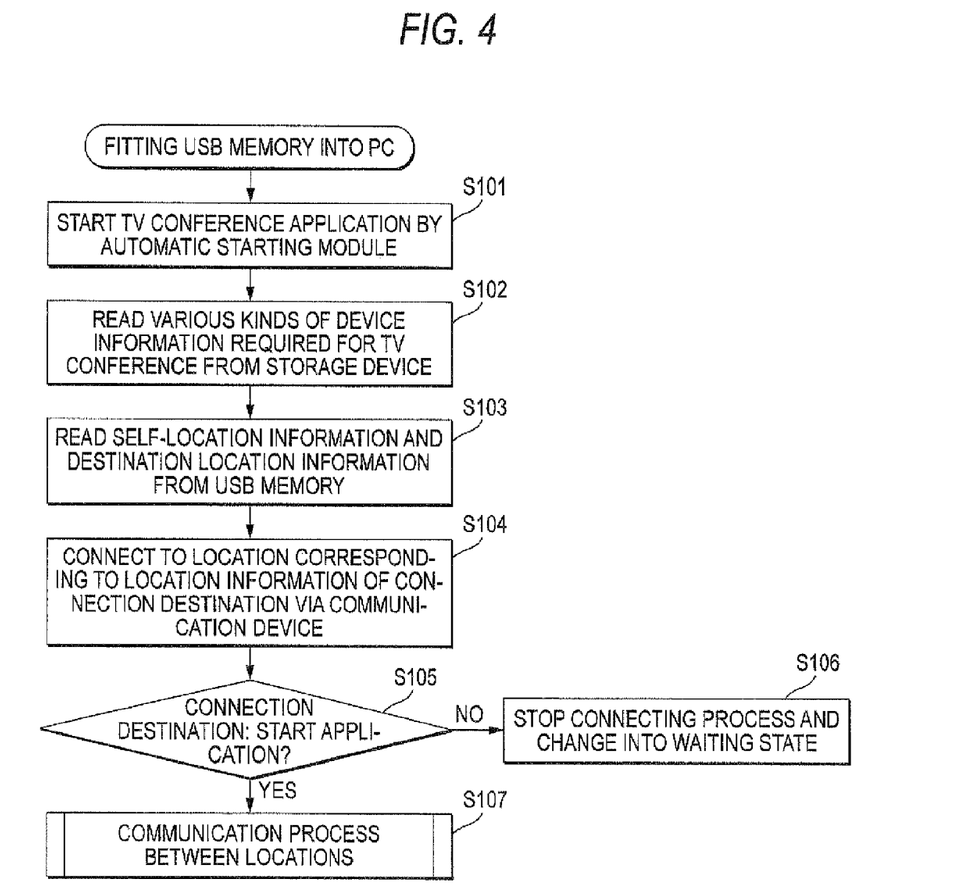
FIG. 4 is a flowchart illustrating an operation sequence of the teleconference performed by the TV conference application stored in the teleconferencing device according to an embodiment of the invention.

FIG. 4 is a flowchart illustrating an operation sequence of the teleconference performed by the TV conference application stored in the teleconferencing device according to an embodiment of the invention. When the USB memory 10 is fitted into the PC 20, the TV conference application 1 is started by the automatic starting module 2 (Step S101). At this time, the starting screen is displayed on the image display 24 connected with the PC 20. Next, the information relating to various kinds of devices required for the TV conference is read by the storage device 21 of the PC 20 (Step S102). Accordingly, for example, the image acquired by the image pickup device 25 can be displayed on the image display 24.

Next, the self-location information 3 and the destination location information 4 are read from the USB memory 10 (Step S103) and the connection between the self-location and the location corresponding to the destination location information is carried out via the communication device 23, on the basis of the location information (Step S104). At this time, information on the location of the connection destination or a state like 'connecting' may be displayed on the image display device 24 and may be notified by the use of the voice output from the voice output device 26.

Next, whether or not the TV conference application is started in the location terminal of the connection destination is determined (Step S105). When it is determined that the application is not started, the connection process is stopped and the procedure of processes is changed into a waiting state (Step S106). When it is determined that the application is started, the communication process between locations is initiated (Step S107). In addition, such sequences are performed by executing the automatic starting module 2 and the program of the TV conference application 1 in the arithmetic device 22.

Figure 5:
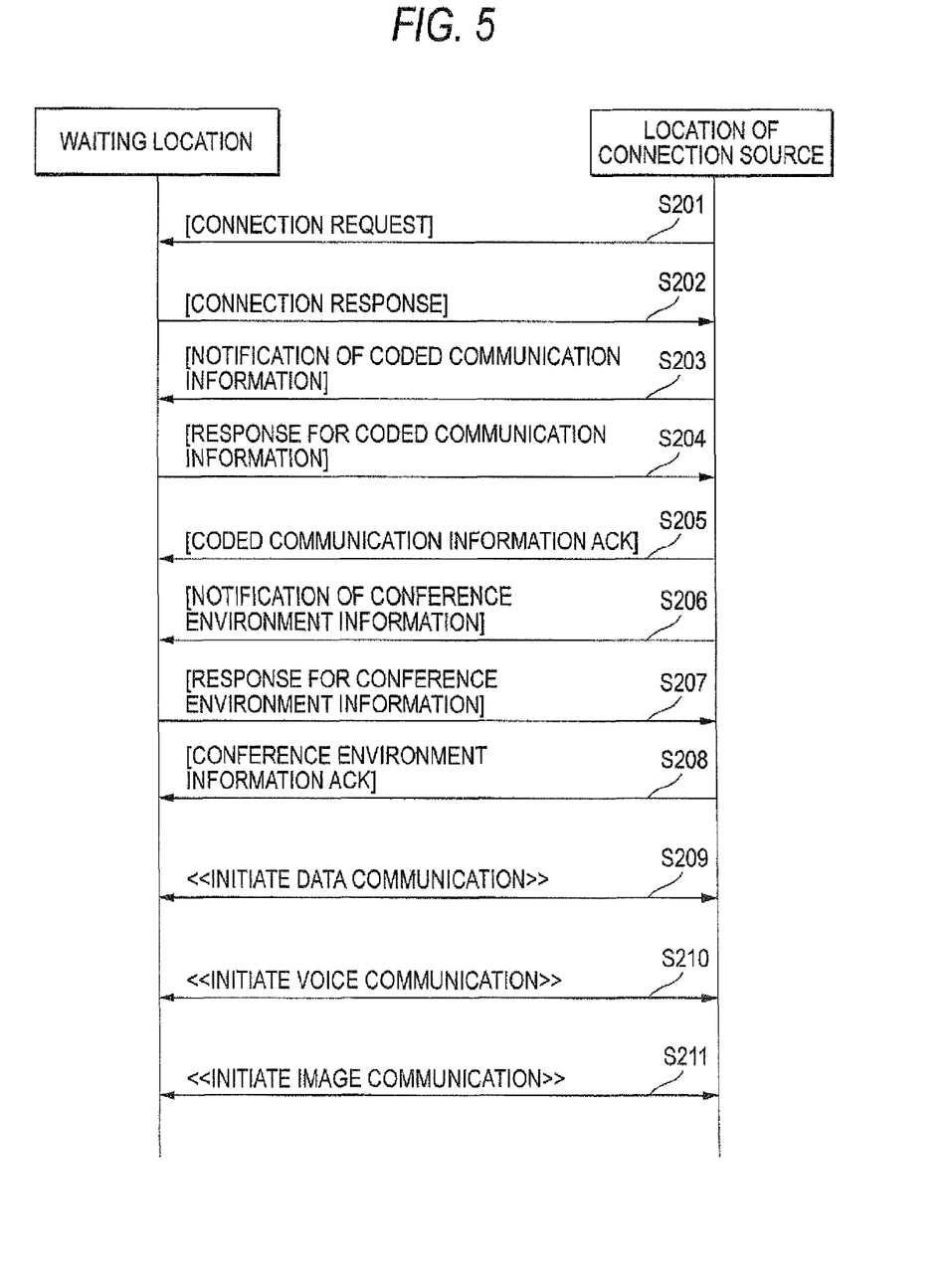
FIG. 5 is a sequence chart illustrating a procedure of a communication process between locations of the teleconference which is performed by the TV conference application stored in the teleconferencing device according to an embodiment of the invention.

Next, FIG. 5 is a sequence chart illustrating a procedure of a communication process between locations of the teleconference which is performed by the TV conference application stored in the teleconferencing device according to an embodiment of the invention. Here, the PC is used as the location terminal of the connection source and the PC 30 is used as a waiting location terminal (see FIG. 3).

First, the PC 20 of the connection source transmits a request command for initiating a communication session with the waiting location (connection destination) PC 30 (Step S201). When not receiving a response to the request command within a predetermined time, the PC 20 determines that there is no waiting location, sets the state of the location to 'waiting', and waits for the connection from the opposite location.

On the other hand, the PC 30 responses for the request from the connection source location PC 20 (Step S202). An example of the response may include additional information such as information enabling a subsequent communication or information disabling the subsequent communication. Next, when the PC 20 of the connection source receives the response, the PC 20 transmits coding information such as a coding method or a code key used for the TV conference communication from the waiting location terminal to the location terminal of the connection source to the PC 30 (Step S203).

Next, the PC 30 transmits the response for the setting of the coding information used for the TV conference communication and the coding information used for the TV conference communication from the waiting location terminal to the location terminal of the connection source (Step S204). The PC 20 receives the response for the setting of the coding information used for the TV conference communication from the waiting location terminal to the location terminal of the connection source (Step S205). In addition, the PC 20 provides the information relating to a communication method such as data communication, voice communication, and image communication which are used for a coding method such as CODEC, and the conference as the conference environment information (Step S206). The number of information to be provided is not limited.

Next, the PC 30 selects the communication method used for the conference from the information provided by the location terminal of the connection source to transmit the command that the PC 20 of the connection source responds (Step S207). The PC 20 transmits a command indicating that it recognizes the conference environment information transmitted from the waiting location terminal (Step S208).

When such procedure is completed, both PC 20 and PC 30 initiate the data communication (Step S209), the voice communication (Step S210), and the image communication (Step S211) on the basis of the conference environment information. The process procedures of Steps S209 to S211 may be changed. In addition, the communication session performed between the communication devices of the location terminals (PC 20 and PC 30) may be carried out according to a known process procedure (such as a communication regulation). Thus, the detailed description of specific data transmission and reception will be omitted.

Figure 6:
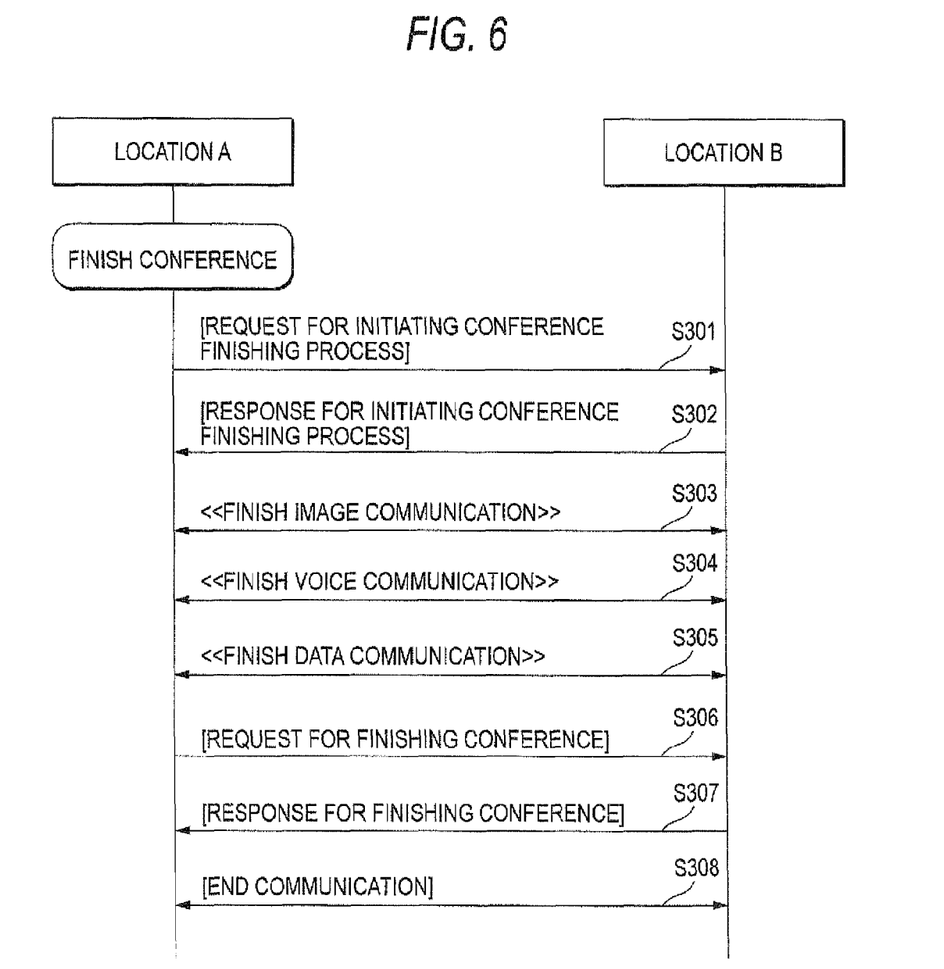
FIG. 6 is a sequence chart illustrating a procedure of a communication finishing process between locations of the teleconference which is performed by the TV conference application stored in the teleconferencing device according to an embodiment of the invention.

Next, FIG. 6 is a sequence chart illustrating a procedure of a communication finishing process between locations of the teleconference which is performed by the TV conference application stored in the teleconferencing device according to an embodiment of the invention. Here, one terminal is used as a location A and the other terminal is used as a location B among terminals performing the communication between locations.

When the conference finishing operation is performed in the location A, a command for initiating a finishing process is transmitted to the location B of the connection destination (Step S301). The location B transmits a command for a response of initiating the conference finishing process (Step S302).

When such procedure is completed, both terminals at the location A and the location B finish the image communication (Step S303), the voice communication (Step S304), and the data communication (Step S305). The procedure of steps S303 to S305 may be changed.

Next, the location A transmits a request for finishing the conference (Step S306), and a command for accepting the finishing of the conference is transmitted from the location B (Step S307). Then, the communication session established between both locations is ended (Step S308).

Further, in the present example, when the USB memory is fitted into the information processing terminal, the automatic starting module stored in the USB memory is firstly executed so that the TV conference application registered in the automatic starting module is operated on the PC. As long as the USB memory is fitted into the PC and then the stored TV conference application is started thereafter, any configuration is possible and the method thereof is not limited.

Hereinabove, an example of using the USB memory as the teleconferencing device has been described, but the example is not limited thereto. The teleconferencing device may include an optical disc such as CD-R, CD-R/W, and DVD, a semiconductor memory, other recording media, and a storage device.

As described above, the teleconferencing device 10 according to the present embodiment which can be fitted into the information processing device 20 includes the teleconference application program 1 which is automatically started by fitting the teleconferencing device into the information processing device 20, the self-location information 3 which is the location information of the teleconferencing device, and the destination location information 4 which is location information of the connection destination holding the teleconference. The teleconference application program 1 reads the self-location information 3 and the destination location information 4 and connects the information processing device to the information processing device 30 of the connection destination via the network.

Accordingly, when the teleconferencing terminal is fitted into the information processing device such as the PC, it is possible to automatically start the stored application program for the teleconference and automatically connect the device with the location terminal of the connection destination which is set in advance.

A teleconference initiating method of the teleconferencing device 10 of the present example is the teleconference initiating method in which the teleconferencing device includes the teleconference application program 1 which is automatically started by fitting the teleconferencing device into the information processing device 20, the self-location information 3 which is the location information of the teleconferencing device, and the destination location information 4 which is location information of the connecting destination holding the teleconference. The method includes starting the teleconference application program 1; acquiring device information required for the teleconference; reading the self-location information 3 and the destination location information 4; connecting the information processing device to the information processing device 30 of the connection destination via the network on the basis of the self-location information and the destination location information; and initiating communication between locations after the connection is completed.

Accordingly, when the teleconferencing device is fitted into the information processing terminal such as the PC, it is possible to automatically start the stored application program for the teleconference and automatically connect the device with the location terminal of the connection destination which is set in advance.

According to an embodiment of the invention, a teleconference initiating program of the teleconferencing device allows a computer to execute steps of the teleconference initiating method of the teleconferencing device including the teleconference application program 1 which is automatically started by fitting the teleconferencing device into the information processing device 20, the self-location information 3 which is the location information of the teleconferencing device, and the destination location information 4 which is location information of the connection destination holding the teleconference. The program allows the computer to execute the steps including: starting the teleconference application program 1; acquiring device information required for the teleconference; reading the self-location information 3 and the destination location information 4; connecting the information processing device to an information processing device 30 of the connection destination via the network, on the basis of the self-location information and the destination location information; and initiating the communication between locations after the connection is completed.

Accordingly, when the teleconferencing device is fitted into the information processing terminal such as the PC, it is possible to automatically start the stored application program for the teleconference and automatically connect the device with the location terminal of the connection destination which is set in advance.

FIG. 1

2: AUTOMATIC STARTING MODULE
1: TV CONFERENCE APPLICATION
3: SELF-LOCATION
4: DESTINATION LOCATION INFORMATION

FIG. 3

21: STORAGE DEVICE (DEVICE)
23: COMMUNICATION DEVICE
22: ARITHMETIC DEVICE
10: USB MEMORY
3: SELF-LOCATION
4: DESTINATION LOCATION INFORMATION
24: IMAGE DISPLAY

25: IMAGE PICKUP DEVICE
26: VOICE OUTPUT DEVICE
27: VOICE INPUT DEVICE

FIG. 4

S101: START TV CONFERENCE APPLICATION BY AUTOMATIC STARTING MODULE
S102: READ VARIOUS KINDS OF DEVICE INFORMATION REQUIRED FOR TV CONFERENCE FROM STORAGE DEVICE
S103: READ SELF-LOCATION INFORMATION AND DESTINATION LOCATION INFORMATION FROM USB MEMORY
S104: CONNECT TO LOCATION CORRESPONDING TO LOCATION INFORMATION OF CONNECTION DESTINATION VIA COMMUNICATION DEVICE
S105: CONNECTION DESTINATION: START APPLICATION?
S106: STOP CONNECTING PROCESS AND CHANGE INTO WAITING STATE
S107: COMMUNICATION PROCESS BETWEEN LOCATIONS

FIG. 5

S201: [CONNECTION REQUEST]
S202: [CONNECTION RESPONSE]
S203: [NOTIFICATION OF CODED COMMUNICATION INFORMATION]
S204: [RESPONSE FOR CODED COMMUNICATION INFORMATION]
S205: [CODED COMMUNICATION INFORMATION ACK]
S206: [NOTIFICATION OF CONFERENCE ENVIRONMENT INFORMATION]
S207: [RESPONSE FOR CONFERENCE ENVIRONMENT INFORMATION]
S208: [CONFERENCE ENVIRONMENT INFORMATION ACK]
S209: <<INITIATE DATA COMMUNICATION>>
S210: <<INITIATE VOICE COMMUNICATION>>
S211: <<INITIATE IMAGE COMMUNICATION>>

FIG. 6

S301: [REQUEST FOR INITIATING CONFERENCE FINISHING PROCESS]
S302: [RESPONSE FOR INITIATING CONFERENCE FINISHING PROCESS]
S303: <<FINISH IMAGE COMMUNICATION>>
S304: <<FINISH VOICE COMMUNICATION>>
S305: <<FINISH DATA COMMUNICATION>>
S306: [REQUEST FOR FINISHING CONFERENCE]
S307: [RESPONSE FOR FINISHING CONFERENCE]
S308: [END COMMUNICATION]

What is claimed is:

1. A teleconferencing device comprising: a connecting unit for fitting into an information processing device; and a storage unit storing: a teleconference application program which is automatically started by fitting the connecting unit into the information processing device; self-location information which is location information of the teleconferencing device; and destination location information which is location information of a connection destination holding a teleconference, wherein the teleconference application program reads the self-location information and the destination location information, automatically connects the information processing device to an information processing device of the connection destination via a network and automatically initiates a communication between a location of the teleconferencing device and a location of the connection destination after the connection is completed.

2. The teleconferencing device according to claim 1, further comprising
a starting module which starts the teleconference application program.

3. The teleconferencing device according to claim 1, wherein
the self-location information and the destination location information are included in the teleconference application program.

4. The teleconferencing device according to claim 1, wherein
the self-location information and the destination location information include at least one of an IP address, a name of a location, and conference environment information.

5. The teleconferencing device according to claim 1, wherein
the destination location information is destination location information on a plurality of locations.

6. The teleconferencing device according to claim 1, further comprising
a code key which codes communication signals with the location of the connection destination.

7. The teleconferencing device according to claim 1, wherein
the teleconferencing device is a portable storage device.

8. The teleconferencing device according to claim 7, wherein
the portable storage device is an USB memory.

9. The teleconferencing device according to claim 1, wherein the teleconference application program reads the self-location information and the destination location information, automatically connects the information processing device to the information processing device of the connection destination via the network and automatically initiates a teleconference between the location of the teleconferencing device and the location of the connection destination after the connection is completed.

10. A teleconference initiating method of a teleconferencing device including a teleconference application program which is automatically started by fitting the teleconferencing device into an information processing device, self-location information which is location information of the teleconferencing device, and destination location information which is location information of a connection destination holding a teleconference, the method comprising:
starting the teleconference application program;
acquiring device information required for the teleconference;
reading the self-location information and the destination location information;
automatically connecting the information processing device to an information processing device of the connection destination via a network, on the basis of the self-location information and the destination location information; and
automatically initiating a communication between a location of the teleconferencing device and a location of the connection destination after the connection is completed.

11. A teleconference initiating program product for enabling a computer to initiating a teleconference using a teleconferencing device including a teleconference application program which is automatically started by fitting the teleconferencing device into the information processing device, self-location information which is location information of the teleconferencing device, and destination location information which is location information of a connection destination holding a teleconference, the program product comprising:

software instructions for enabling the computer to perform predetermined operations; and    a computer readable medium storing the software instructions,    wherein the predetermined operations comprise:

starting the teleconference application program;

acquiring device information required for the teleconference;

reading the self-location information and the destination location information;

automatically connecting the information processing device to an information processing device of the connection destination via a network, on the basis of the self-location information and the destination location information; and      automatically initiating a communication between a location of the teleconferencing device and a location of the connection destination after the connection is completed.

\* \* \* \* \*